UNITED STATES PATENT OFFICE 2,161,628

INTERMEDIATES FOR AZO DYES

Herman W. Mathieu and Swanie S. Rossander, Wilmington, Del., assignors to E. I. du Pont de Nemours & Company, Wilmington, Del., a corporation of Delaware No Drawing. Application June 23, 1937, Serial No. 149,890

8 Claims. (Cl. 260—558)

This invention relates to new chemical compounds which are useful in the manufacture of azo dyestuffs. The new compounds are amino or nitro derivatives of benzoyl-amino-benzenes.

It is an object of the invention to produce the new compounds to which the invention relates for use in the manufacture of superior dyes. It is also an object of the invention to produce these new intermediates by methods which are economically and technically satisfactory and which produce the product in the state of high purity. A demand in the trade has arisen for new intermediates having free amino groups having high qualities of permanence and fastness. In order to supply this demand, we have made the products more fully hereinbefore described.

The objects of the invention are accomplished, generally speaking, by condensing a phenylenediamine or a nitro-aniline also substituted by at least one group from the class consisting of halogen, oxyacetic acid, alkyl and alkoxy, and alkoxy and alkoxy with a nitro-benzoic acid or a reactive acid derivative thereof. The nitro groups may be reduced.

There are two satisfactory methods of accomplishing this coupling, of which the preferred is represented by the following example:

Example I

Charge an enameled kettle with 100 parts of 2-chlor-4-nitro-aniline, 99 parts of para-nitro benzoic acid and 1300 parts of toluene. Agitate while heating to the boil. Distill off the toluene until no water is obtained in the distillate, add dry toluene equivalent to the amount removed by dstillation. Cool to 50° C. and add 45 parts of phosphorous trichloride slowly over one hour. Heat slowly to the reflux, and reflux until no more hydrogen chloride gas is evolved. Cool to 25° C. and filter. Slurry in 1600 parts of water, and add sodium carbonate until alkaline to brilliant yellow paper, about 20 parts were required in this example. Heat to 50° C. and hold for one hour. Add soda ash as necessary to maintain alkalinity on briliiant yellow paper. Filter. Wash the press cake until the filtrate is neutral to briliant yellow paper. Reslurry the residue in 1600 parts of water and add 5.1 parts of hydrochloric acid, warm to 40° C. and filter. Dry at 40° to 60° C., and grind to a fine powder. Charge the powder in an autoclave with 240 parts of methanol and 10 parts of nickel catalyst. Flush out the air with hydrogen. Stir and heat to 100° C. Hold the hydrogen at 500 lbs. pressure until no more hydrogen is absorbed. Cool the autoclave and blow the charge into a hot water jacketed still and distill off 200 parts of alcohol. Drown the reaction mass in 800 parts of water containing 12 parts of hydrochloric acid. Stir and heat to 60° C. Filter hot, wash the residue with 200 parts of hot water and combine the washings with the filtrate. Cool the combined fluids to 25° C. and add ammonia (approx. 6 parts) until a test sample when filtered shows no precipitate when treated with a drop of ammonia water. Filter, wash the cake with 200 parts of water and dry at 40-60° C. The dry powder is white and crystalline. Its hydrochloride is soluble in water. The formula of the obtained product is:

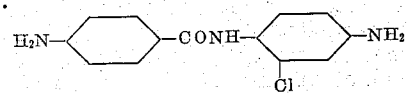

Example II

The same product may be made by condensing 2-chloro-4-nitro-aniline with para-nitro-benzoyl-chloride and reducing the nitro groups with iron and acetic acid, or by some other satisfactory reducing process of the prior art.

Following similar methods, other compounds falling within the broad definition of the invention can be made. Examples of those compounds are the following formulas:

Example III

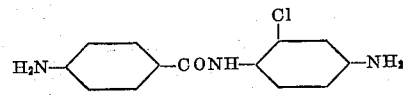

Example IV

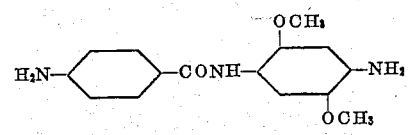

Example V

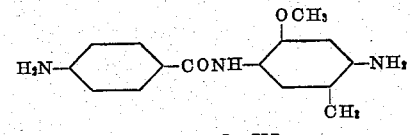

Example VI

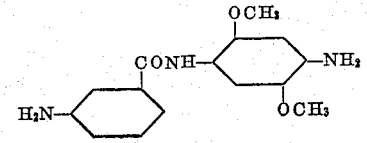

*Example VII*

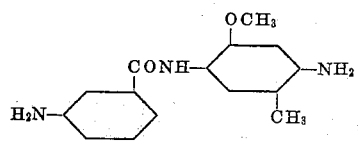

*Example VIII*

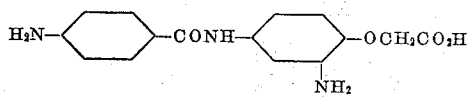

Many modifications of the generic invention may be made. For instance, alkoxy is in the preferred form of the invention limited to less than four carbon atoms. Holagen may be any member of the halogen family. Alkyl may contain from one to eighteen carbon atoms, but methyl is preferred. Other substituent groups in addition to those essential may also be present. These groups will replace hydrogen of either or both aryl nuclei. The phenylene diamine may be the ortho, meta, or para isomers, but it must contain one of the indicated essential groups.

An advantage of the invention is the production of new intermediates which, when diazotized and coupled to typical coupling components, form azo dyes having stability superior to that of dyes of similar color of the prior art. Other advantages of the invention lie in the details of process and in the other qualities and uses of the product.

As many apparently widely different embodiments of this invention may be made without departing from the spirit and scope thereof, it is to be understood that we do not limit ourselves to the specific embodiments thereof except as defined in the appended claims.

We claim:

1. A compound represented by the formula:

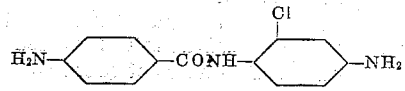

2. A compound represented by the formula:

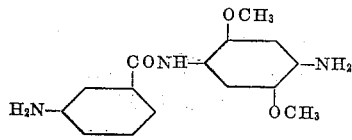

3. A compound represented by the formula:

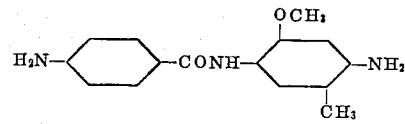

4. The process comprising mixing 2-chlor-4-nitro-aniline, para-nitro-benzoic acid, and a solvent, distilling off water and replacing distilled solvent, adding phosphorous trichloride at about 50° C., refluxing until the evolution of hydrochloric acid ceases, isolating and purifying the dinitro body, heating at superatmospheric pressure in the presence of hydrogen and a reduction catalyst, cooling, precipitating, and purifying the product.

5. The process comprising dissolving 2-chlor-4-nitro-aniline and para-nitro-benzoic acid, in a substantially non-aqueous medium, adding a condensing agent at a temperature of about 50° C., heating during the evolution of hydrochloric acid gas, isolating the product, and heating it at superatmospheric pressure in the presence of hydrogen and a reducing catalyst.

6. The process which comprises dissolving a nitro-aniline substituted by one of the group consisting of halogen, oxyacetic acid, alkyl and alkoxy, and alkoxy and alkoxy with a nitro-benzoic acid otherwise free from water-solubilizing groups in a substantially non-aqueous medium, heating at about 50° C. in the presence of a condensing agent, isolating the product, and reducing the product in the presence of hydrogen and a reduction catalyst.

7. The process which comprises dissolving a nitro-aniline substituted by one of the group consisting of halogen, oxyacetic acid, alkyl and alkoxy and alkoxy with a nitro-benzoic acid otherwise free from water-solubilizing groups in a substantially non-aqueous medium, heating at about 50° C. in the presence of a condensing agent, isolating the product, and reducing the product.

8. A compound free from water-solubilizing groups represented by the formula:

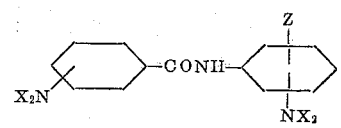

in which X is one of the group consisting of hydrogen and oxygen and Z is one of the group consisting of halogen, oxyacetic acid, alkyl and alkoxy, and alkoxy and alkoxy.

SWANIE S. ROSSANDER.
HERMAN W. MATHIEU.

CERTIFICATE OF CORRECTION.

Patent No. 2,161,628.  June 6, 1939.

HERMAN W. MATHIEU, ET AL.

It is hereby certified that error appears in the printed specification of the above numbered patent requiring correction as follows: Page 1, first column, line 36, for "dstillation" read distillation; lines 41 and 46, for "briliant" read brilliant; line 42, for "20 parts" read 80 parts; line 45, for "brilliant" read brilliant; page 2, first column, line 19, for the word "Holagen" read Halogen; same page, second column, line 38, claim 7, after "alkoxy" first occurrence, insert a comma; and that the said Letters Patent should be read with this correction therein that the same may conform to the record of the case in the Patent Office.

Signed and sealed this 25th day of July, A. D. 1939.

(Seal)

Henry Van Arsdale,
Acting Commissioner of Patents.